UNITED STATES PATENT OFFICE.

WILLARD C. BRUSON, OF CHICAGO, ILLINOIS, ASSIGNOR TO HIMSELF AND GEORGE ROUNDS, OF SAME PLACE.

IMPROVED COMPOSITION FOR PRESERVING EGGS.

Specification forming part of Letters Patent No. 89,285, dated April 27, 1869.

*To all whom it may concern:*

Be it known that I, WILLARD C. BRUSON, of the city of Chicago, in the county of Cook and State of Illinois, have invented a new and Improved Composition for the Preservation of Eggs; and I do hereby declare that the following is a full and clear description of the compounding and using the same.

The nature of my invention consists in combining certain chemical substances, in the required proportions, for the convenient, economical, and effective preservation of eggs, by the use of which eggs may be kept in the same condition as when placed in the preparation hereinafter described.

It is a well-known fact that heretofore there has been no successful and practical method, which meets with the general approval of the public, for the preservation of eggs. In my invention I claim to have obviated those objections. I claim the keeping of eggs in a fresh and healthy condition, at a reasonable expense, by the use of my egg-preservative. Furthermore, I claim to have originated a new theory for the preservation of eggs, which theory I have confirmed by practical demonstration, and have given the mode the appellation "electroized," derived from the peculiar electrical action and effect of my composition in the treatment of eggs; therefore I have denominated my composition the "Electro Egg-Preservative."

To further illustrate my theory and practice in the treatment of eggs, I will state in brief, to wit:

The elementary substances which compose the animal and vegetable kingdom are held together by the laws of organic life; but when deprived of this bond they have a tendency to separate from each other and enter into new combinations. This is a universal law of nature. Organic bodies come into existence, and, if permitted, live their allotted time, and die. If nothing retards the usual course of things, they pass into other conditions. For example, the egg, when it first commences to decay, the albumen is the base of putrefactive fermentation, and subsequently the yolk is involved in the chemical change known as "putrefaction."

The composition of a fresh egg is, carbon, about fifty-five parts; nitrogen, about sixteen parts; oxygen, about seventeen parts; hydrogen, about seven parts; sulphur, about three parts; phosphorus, about two parts; which, in the progress of organic dissolution, separate from each other and combine again, as follows: The carbon absorbs oxygen, and forms carbonic acid; one portion of the hydrogen forms water with the oxygen; another part, uniting with the nitrogen, composes ammonia; another portion combines with the carbon, producing carbureted-hydrogen gas; and the remainder unites with the phosphorus and sulphur, producing phosphoreted and sulphureted hydrogen gases, which are, in a great measure, the cause of the fetor, so offensive to the sense of smell, evolved by the breaking of a perfectly rotten egg.

And, having ascertained the cause of the sickness and death of the egg, and its subsequent changes, resulting in its disintegration and recombinations, the next step is the adaptation of appropriate remedial agents to prolong the life of the egg, by keeping it in a healthy condition indefinitely.

The remedy, I claim to have invented, and named the "Electro Egg-Preservative;" and by its use I claim that it electroizes the organic constituents of the egg, thereby preventing decomposition.

The theory and practical demonstration of my electro egg-preservative, for keeping eggs fresh and sweet, I will set forth in a summary form, to wit:

The egg, during its retention of the vital principle, or embryo of the prospective chick, in a living state, possesses in itself a certain degree of animal heat, which tends materially to promote the decomposition of the substance of the egg. But suspend the embryotic principle, and thereby relieve the germinating heat, the first important point is obtained in preventing dissolution. Then suspend or neutralize, with non-deleterious chemical agents of the properly-electroized order, specific materials contained in the *albumen ovi* and *vitellus ovi* of the egg, which have a tendency to form gaseous combinations, also effectually cure the organic constituents of the egg with appropriate antiseptic agents, and at the same time leave the membranous lining, also the

*testa ovi*, in such a condition that they are rendered impervious to all foreign substances that could otherwise impart unpleasant flavors to the egg.

The substance of the egg being then electroized, I claim it will remain unchanged for ages.

To enable others skilled in the art to make and use my invention, I will proceed to enumerate the materials used, and manner of compounding and using the same.

I take *creta alba*, calcinated, three pounds; place it in a suitable vessel, either glass, porcelain, tin, or wood. I also take nitrate of potassa, three ounces, and *saccharum alba*, nine ounces. Dissolve the two last-mentioned substances in boiling-hot water, about sixteen ounces. Agitate for a few minutes, until the ingredients are dissolved. Then pour the hot solution (or it is better to sprinkle it) gradually onto the calcinated *creta alba*. Occupy about four of five minutes in the operation, and endeavor to evenly distribute the hot solution over the same. Soon as this is accomplished, closely cover the vessel, for the purpose of retaining the heat and steam, also to prevent the compound from absorbing gaseous elements from the atmosphere.

Let the vessel remain covered about one hour. At the expiration of that time remove the cover and add the following, which should be mixed during the preceding hour: I take chloride of sodium, four pounds; sulphite of calcium, four ounces; *carbo animalis*, ten ounces. Mix well together, and add it to the compound in the vessel before mentioned. Mix all together for a few minutes until it assumes a uniform grayish appearance. The composition is then complete and ready for use, according to the directions hereinafter set forth.

If my electro egg-preservative is kept on hand (if even but for a few hours before using) it should be put in air-tight vessels, as it is liable to lose its strength and become deteriorated by imbibing gases from the atmosphere.

I will now proceed to give directions for calcinating the *creta alba*. I take hard white English chalk, break it in pieces about the size of a tea-cup, expose the pieces to a strong heat for about ninety minutes, or until it can readily be reduced to a dry powder in a few minutes' time by the application of about one-third or two-fifths its weight of hot water.

The white chalk may be calcinated in a crucible when submitted to an intense heat, or the chalk may be placed in a hard-coal or wood stove when the coals are at full red heat.

By submitting a piece of the chalk to the above-mentioned water-test, the length of time for calcinating can readily be determined.

After the calcinated *creta alba* becomes cool, it must be immediately secured in closed vessels to prevent it becoming impregnated with gases from the air. It is then ready for use, as before directed.

In my composition I also claim the use of any pure oxide of calcium that may be derived from other sources. In regard to the quantity of chloride of sodium I have specified in the foregoing formula, I make it a point to use more or less, as the solution hereinafter mentioned may require, to wit: In consequence of the chloride of sodium not being of uniform strength, I use sufficient quantity to make my egg-preserving solution of the requisite specific gravity to just hold or suspend the egg, with the small end downward. A little experience will thus determine the requisite quantity to be used.

When preparing my egg-preservative, if it is designed to allow the eggs to remain in the solution but a few weeks, about one-half or two-thirds of the quantity of calcined *creta alba* before mentioned will answer the purpose; and if it is desired to keep the eggs in the solution for a year, or thereabout, from three to four or five pounds may be used.

I will now proceed to give the directions for the general use of my electro egg-preservative. Place the quantity of composition specified in the foregoing formula in at least a thirty-two-gallon cask, and add three gallons of pure boiling-hot water, and stir thoroughly for a few minutes. After standing about thirty minutes, stirring occasionally, add twelve gallons of pure cold water, making in all fifteen gallons. The solution is then of the required strength, and is sufficient to cover about one hundred dozen eggs. Allow the solution to remain at least twelve hours, stirring occasionally. The electro egg-preserving solution is then ready to receive the eggs.

It is advisable to keep the cask containing the solution and eggs in a cellar or some cool place, and the top of the cask should be closely covered with a thick cloth, in addition to a wood or other suitable covering, to prevent loss of the solution by evaporation, or its becoming impregnated with impurities from the air.

This process perfectly electroizes the eggs; and after they have remained in the solution for nine days, or thereabout, the eggs may be taken out of the solution and placed in slotted boxes, for the purpose of draining, and, when dry, they may be placed in barrels, boxes, or other suitable vessels, and stored in some convenient place until they are required for use or market; or the eggs may, if desirable, remain in the solution for an indefinite period. In either case they will remain in a perfectly-fresh condition. Only fresh and sound eggs should be put in this solution, as I do not claim, by its use, to transform damaged eggs to a fresh condition.

It is not necessary that the one hundred dozen eggs should be placed in the solution at one time. They may be put in at different times, as convenience requires.

This solution is not designed to electroize eggs the second time. After the eggs have been taken out, throw the solution away, as the electroizing properties are exhausted by the first one hundred dozen.

The operation of my electro egg-preservative, I claim, effectually preserves the edible substance of the egg in a moist and fresh condition, without imparting to it any unpleasant flavor or proving deleterious in the least.

In addition to preserving the substance of the egg, I claim that my egg-preservative thickens or hardens the white semi-opaque membrane lining the internal surface of the shell, thereby preventing, in a measure, the evaporation or escape of fluids from the substance of the egg, which might otherwise lessen its weight. I also claim that my egg-preservative strengthens the delicate membrane (oönin) which constitutes the partitioning substance of the cells that inclose the *albumen ovi*, thereby holding the albuminous portion of the egg in a natural form, and in a great measure checking its tendency to mix with the yolk by agitation during transportation. Furthermore, I claim that my egg-preservative prepares the shell (*testa ovi*) by strengthening and increasing its thickness, forming, as it were, an artificial shell or insoluble covering of such a nature that it not only renders the escape of the fluids by evaporation impossible, but prevents the substance of the egg from becoming impregnated with any unpleasant flavor from any source whatever, and at the same time imparts additional strength and durability to the shell, which, for the convenient handling and shipping of eggs, is a very important desideratum.

Having thus described my invention, I claim as new and desire to secure by Letters Patent—

The composition above described, compounded of the ingredients mentioned, substantially as and for the purpose set forth.

WILLARD C. BRUSON.

Witnesses:
A. L. BROOKS,
GEORGE ROUNDS.